United States Patent

Elsbett et al.

[11] 3,945,363
[45] Mar. 23, 1976

[54] RECIPROCATING PISTON INTERNAL COMBUSTION ENGINE WITH TWIST FORMING CONDUIT MEANS, ESPECIALLY IN THE INTAKE SYSTEM THEREOF

[76] Inventors: Ludwig Elsbett, Industriestrasse 14; Günter Elsbett, both of D 8543 Hilpoltstein, Germany

[22] Filed: Aug. 28, 1973

[21] Appl. No.: 392,340

[52] U.S. Cl. ............................ 123/188 M; 123/30 C
[51] Int. Cl.² ............................................ F01L 3/00
[58] Field of Search ......... 123/188 M, 30 C, 193 H, 123/191 M

[56] References Cited
UNITED STATES PATENTS
3,274,981  9/1966  Peras .............................. 123/188 M FOREIGN PATENTS OR APPLICATIONS
1,207,904  10/1970  United Kingdom ............ 123/188 M
1,956,350  5/1971  Germany ........................ 123/188 M
2,012,436  11/1970  Germany ........................ 123/188 M Primary Examiner—Charles J. Myhre
Assistant Examiner—James D. Liles
Attorney, Agent, or Firm—Walter Becker

[57]  ABSTRACT

A reciprocable piston internal combustion engine provided with twist forming passage means, especially in the intake system of the engine, which passage means for imparting a desired twist upon a gaseous medium passing through the twist forming passage means is curved in conformity with the desired twist and has at least one shut-off valve in a cylinder head and also comprises a helical section and an S-shaped curved section adjacent thereto while at least one end point of the curved section is located on or within the range of a cross-sectional plane of the passage means and the helix axis of the helical section is arranged on or within the range of the cross-sectional plane extending transverse to and intersecting the cylinder axis but located eccentrically with regard to the valve axis, and while that end of the helical section which faces toward the cylinder chamber leads into a cylindrical valve opening passage, the cross section of the helical section from its inlet to the valve opening passage having a trapezoidal shape.

7 Claims, 2 Drawing Figures

RECIPROCATING PISTON INTERNAL COMBUSTION ENGINE WITH TWIST FORMING CONDUIT MEANS, ESPECIALLY IN THE INTAKE SYSTEM THEREOF

The present invention relates to twist-forming conduit means, especially in the intake system of reciprocatory piston internal combustion engines, which conduit means, for creating a turning movement of a gaseous medium passed therethrough in the direction of the desired twist, is curved and is in the interior thereof provided with at least one shut-off member in the form of a valve located in a cylinder head. More specifically, the present invention relates to twist-forming conduit means of the above mentioned type which has a helical section and an adjacent curved section, which helical section is provided between said curved section and the cylinder chamber while at least one end point of the curved section is located on or within the region of a cross-sectional plane of said conduit means. This plane is parallel to a further conduit cross-sectional plane extending at a right angle to the cylinder axis. In this conduit means the helical axis of the helical section is arranged on or within the region of the conduit cross-sectional plane passing through the cylinder axis, but located eccentrically with regard to the valve axis. The curved section is S-shaped and its end points are located on or within the region of the first cross-sectional plane. The helical section has an approximately continuous pitch and has a helical angle of at least 220° as well as an approximately constant distance between the helical axis and that wall of the conduit means which is located opposite said helical axis. That end of the helical section which faces toward the cylinder chamber leads into a cylindrical valve opening passage which opens toward the cylinder chamber.

A passageway or conduit means of the above mentioned type has been described in our copending application Ser. No. 379,557, filed July 16, 1973. The twist-forming passage or conduit means according to said application Ser. No. 379,557 is formed primarily by three passage sections of which, starting with a cylinder of an internal combustion engine, the first section is designed as cylindrical valve opening passage while the adjacent section is formed as a helical section, and the third section adjacent to said last mentioned section is designed as an S-shaped curved guiding passage. The guiding passage of the design according to said U.S. patent application Ser. No. 379,557 extends from a so-called turning point to a so-called helical point and has a uniform passage cross section which preferably extends over the entire length of the guiding passage, and merges with the same cross-section with the helical section. The helical section which forms the connection of the guiding passage with the inlet opening of the valve opening passage also has a uniform cross-section while the respective spacing from its side walls to the helical point thereof remains at least approximately the same. In order, on one hand to place the helical point on a conduit cross-sectional plane which passes through the valve guiding means, and in order on the other hand to be able to move the guiding passage in a flow-aiding manner to the helical point, a web or blade is provided between the valve guiding means and the wall adjacent thereto, which wall pertains to the guiding passage or guiding conduit. The said web or blade is, with its root portion, connected to the wall of the guiding passage and with its tip is connected to the valve guiding means. By means of this web or blade, the helical section is, in its length, limited from its inlet to its outlet passage, so that the air passing through the passage or conduit is forced by the web or blade on one hand, into the helical section, and on the other hand into the valve opening passage. This is likewise set forth in applicant's above mentioned copending application Ser. No. 379,557.

Starting with a passage or conduit means of the above mentioned type, it is an object of the present invention so to further improve the helical section of the passage or conduit means that the air will particularly strongly press against a wall of the helical section, namely, that wall which faces away from the opening of the valve opening passage, in order thereby in a definite manner and at a high speed, to pass through the valve opening passage into the cylinder of the internal combustion engine, while at the same time there is formed a distinct twist.

These and other objects and advantages of the invention will appear more clearly from the following specification, in connection with the accompanying drawing, in which.

Figure 1:
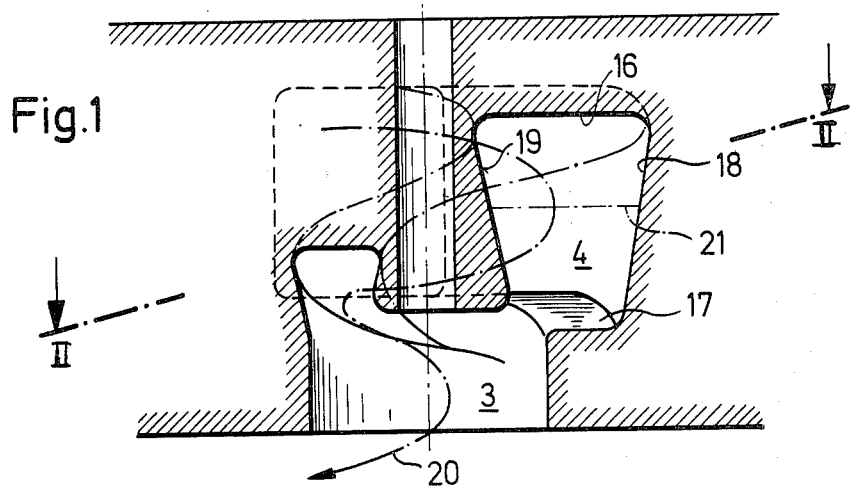
FIG. 1 represents a cross-section through the helical section of the passage, said cross-section being taken along the line I—I of FIG. 2.

Starting with the passage 1 according to our copending application Ser. No. 379,557, also this passage according to the invention is formed primarily by three sections. One of these sections is adjacent to the cylinder of the internal combustion engine, and is designed as valve opening passage 3. The helical section 4 adjacent the valve opening passage 3 is arranged between the valve opening passage 3 and a guiding passage 5 adjacent thereto. That end of the guiding passage 5 which faces away from the helical section leads into an intake conduit 15. The guiding passage 5 which also in this instance is located between two passage cross-sectional planes K, K' is preferably curved in an S-shaped manner and merges from a round or rectangular cross-section with a trapezoidal cross-section of the helical section 4. The helical section 4 is, from the inlet thereof to the valve opening passage 3, designed trapezoidal, while the basis 16 of the trapezoid faces away from the opening of the valve opening passage 3. Consequently, the lateral walls 18 and 19 of the trapezoidal section 4, as well as the basis 16 and the cover surface 17 located opposite thereto are arranged so as to be inclined toward the valve opening. Also the web or blade 7 which connects the valve guiding means 9 with the wall of the guiding passage 5 is provided with guiding surfaces which likewise are inclined toward the valve opening passage 3. The helix axis Y of the helical section 4 is, also in this instance, offset by the distance $a$ with regard to the longitudinal central axis of the valve which means the valve axis V, so that the helical section winds around this axis Y toward the valve opening passage 3. In order better to show the lateral walls 18 and 19 of the helical section 4, these walls are marked in FIG. 2 with a cross-shading. In view of this design of the helical section 4, the air 20 passing by through this section 4 is pressed by the laterally inclined walls 18 and 19 against the basis 16 of the trapezoidal cross-section whereby a very intensified twist is imparted upon the air. The reversing point 14 of the passage 1 is also with this embodiment located on a straight line E which connects the helical axis Y with said reversing point 14. From this point on, a pipe 15 leading to the remaining intake system, or a compensating container may be connected. The air passed through the passage 1 is pressed by the shape of the helical section 4 into the valve opening passage 3 where it is passed on further by the cylinder walls while practically completely retaining its twist structure. As to the distance $b$ from the lateral walls 18, 19 to the helical axis Y, this distance remains at least approximately the same while taking into consideration the inclined position of the lateral walls 18, 19. This distance may preferably be measured at the corresponding belt zones 21 of the lateral walls 18, 19.

Numerous tests with the conduit means according to the invention have proved that a cross-sectional surface of the trapezoidal conduit section 4 of approximately 10 square centimeters per liter volume is very satisfactory in order to obtain the desired twist formation. Of course, these values are to be adapted to the size of the engine and its power in relationship to said values.

Figure 2:
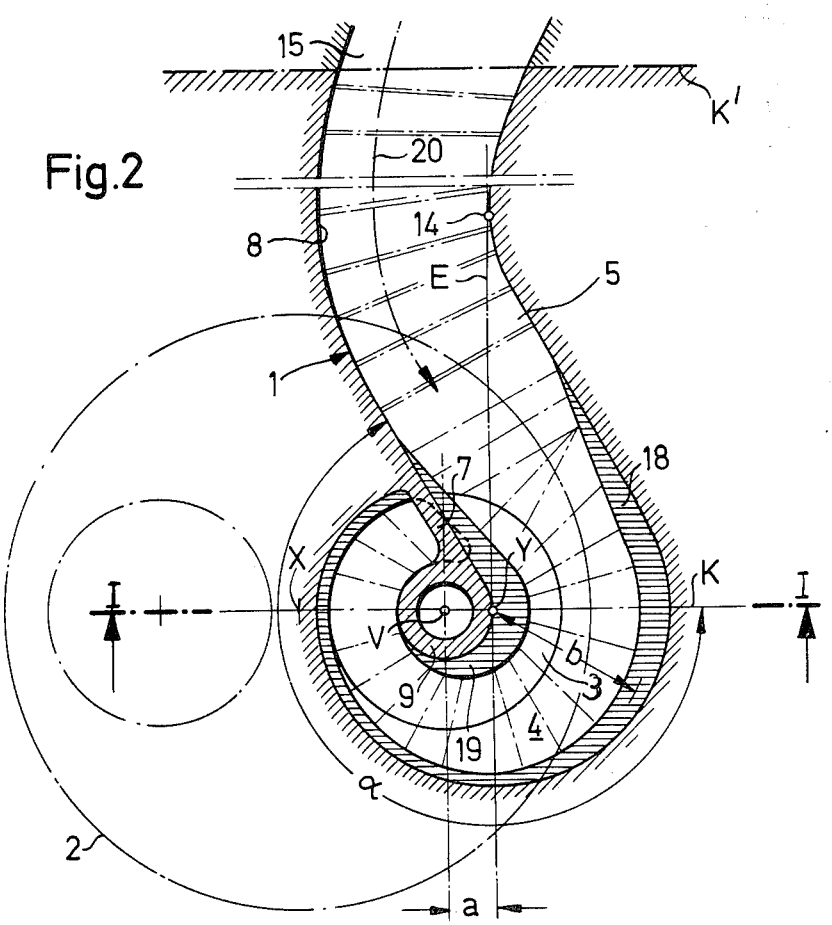
FIG. 2 is a section taken along the line II—II of FIG. 1.

With the embodiment of the conduit means illustrated in FIG. 2, the S-shaped curved guiding passage 5 is at its end which faces toward the helical section 4 likewise trapezoidal, while the basis 16 of the cross-section begins to ascend already where also the trapezoidal shape of the conduit means ascends. This ascent may, as indicated in FIG. 2 be located far above the helical angle of 240°, as indicated in our copending application Ser. No. 379,557.

It is, of course, to be understood that the present invention is, by no means, limited to the specific showing in the drawing, but also comprises any modifications within the scope of the appended claims.

What we claim is:

1. A reciprocable piston internal combustion engine having a cylinder, a cylinder head associated with said cylinder and having therein twist forming passage means leading to said cylinder for conveying thereto a gaseous medium, valve means with a cylindrical opening and arranged in said twist forming passage means for controlling the supply of gaseous medium from said twist forming passage means including a helical section adjacent the cylindrical opening and an S-shaped curved section with one end adjacent said helical section and leading to said cylinder while one end of said curved section is located extending at least approximately from a first cross sectional plane approximately to a second cross-sectional plane which is determined by the cylinder axis and the axis of said valve means, both axes lying in said plane, said first cross-sectional plane and said second cross-sectional plane being substantially parallel to each other, and the end points of said S-shaped curved section being located on one hand at least approximately in said first cross-sectional plane and on the other hand at least approximately in said second cross-sectional plane, while said helical section has an approximately constant pitch and a helical angle of at least 220°, while the axis of said helix is in said second plane and spaced from that lateral wall of said passage means which is located opposite said helix axis, the cross-section of said helical section from its inlet joining said curved section to the section of the valve means controlled passage means having a trapezoidal shape, with its walls inclined relatively to said axes of said cylinder and valve means, and with its wider base facing away from the opening of the section of the valve means controlled passage means.

2. An internal combustion engine according to claim 1, in which said helical section includes a blade and guiding means for said valve means, said blade connecting said guiding means with the wall of said curved section of said passage means, the inlet of said helical section being located within the region of said S-shaped curved section.

3. An internal combustion engine according to claim 1, in which that helical-shaped section which comprises the trapezoidal cross-section leads into the cylindrical opening of said valve means in a smooth manner.

4. A reciprocable piston internal combustion engine having a cylinder, a cylinder head associated with said cylinder and having therein passage means wound around an axis to impart a desired swirl pattern to the gaseous fluid passing through, one end of said passage communicating with the cylinder of the engine and the other end communicating with a manifold connecting a plurality of such passages, the opening of at least one of the ends being arranged to be openable and closable in accordance with the timing of the engine working cycles, said passage means consisting of three sections in series including a cylindrical valve opening section adjacent to the cylinder, followed by a helical section and an S-shaped curved section between the latter and the manifold or atmosphere, said curved section being arranged between two cross-section planes through the passage, one of which coinciding with the axis of the vlave and the cylinder which lie in said plane and the other cross-section plane passing through the connecting plane of the curved passage section with the manifold, the cross-section planes through the passage being substantially parallel to each other, while the helix axis of the passage is disposed in the same direction as the axis of the valve in the cross-section plane, but offset from the axis of the valve, the helical passage section having an approximately constant pitch and a helix angle of at least 220° calculated from the associated cross-section plane in which said axes lie, and the helix axis being at an approximately constant distance from a side wall of the passage facing it, and the helical passage section being shaped with a trapezoidal cross-section between its inlet at the S-shaped curved passage section and the valve opening section, in which the wider base of the trapezoidal cross-section faces away from the opening of the valve opening section of said passage.

5. An internal combustion engine according to claim 4, in which the end of the S-shaped curved passage section facing the helical passage section is also formed with a trapezoidal cross-section and having a streamlined transition between said cross-section and the trapezoidal curved passage section.

6. An internal combustion engine according to claim 4, in which a blade is provided in the area of the transition between the helical passage section and the valve opening section, said blade being connected with its root to the cylinder head and with its top end to a valve guide and in which the side walls of the helical passage section are also shaped with a trapezoidal cross-section in the region of said blade.

7. An internal combustion engine according to claim 4, in which the helical passage section blends into the cylindrical valve opening passage without any corners.

* * * * *